(12) United States Patent
Mishra et al.

(10) Patent No.: US 9,400,937 B2
(45) Date of Patent: Jul. 26, 2016

(54) METHOD AND APPARATUS FOR SEGMENTATION OF FOREGROUND OBJECTS IN IMAGES AND PROCESSING THEREOF

(71) Applicant: Nokia Technologies Oy, Espoo (FI)

(72) Inventors: Pranav Mishra, Bangalore (IN); Rajeswari Kannan, Bangalore (IN); Ravi Shenoy, Bangalore (IN); Ramesh Raskar, Cambridge, MA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/546,331

(22) Filed: Nov. 18, 2014

(65) Prior Publication Data

US 2015/0138389 A1    May 21, 2015

(30) Foreign Application Priority Data

Nov. 21, 2013   (IN) ............................ 5374/CHE/2013

(51) Int. Cl.
*G06K 9/46*    (2006.01)
*G06T 7/00*    (2006.01)
(Continued)

(52) U.S. Cl.
CPC . *G06K 9/46* (2013.01); *G06T 7/002* (2013.01); *G06T 7/0081* (2013.01); *G06K 2009/4666* (2013.01); *G06T 2207/10012* (2013.01); *G06T 2207/10152* (2013.01);
(Continued)

(58) Field of Classification Search
CPC ... H04N 5/2353; H04N 5/351; H04N 5/2256; G06T 7/0081; G06T 7/002; G06T 2207/20144; G06T 2207/10012; G06T 2207/10152; G06K 9/46; G06K 2009/4666
See application file for complete search history.

(56) References Cited

U.S. PATENT DOCUMENTS

| 7,808,532 B2 * | 10/2010 | Sun | G06T 7/0081 348/224.1 |
|---|---|---|---|
| 2006/0039690 A1 * | 2/2006 | Steinberg | G06K 9/00248 396/155 |
| 2009/0273685 A1 * | 11/2009 | Ciuc | G06T 7/0081 348/222.1 |

(Continued)

FOREIGN PATENT DOCUMENTS

| EP | 1235439 A2 | 8/2002 |
| EP | 2579567 A1 | 4/2013 |

OTHER PUBLICATIONS

Extended European Search Report received for corresponding European Patent Application No. 14193574.2, dated Mar. 25, 2015, 7 pages.

(Continued)

*Primary Examiner* — Timothy J Henn
(74) *Attorney, Agent, or Firm* — Alston & Bird LLP

(57) ABSTRACT

In an example embodiment, a method, apparatus and computer program product are provided. The method includes facilitating capture of at least one image of a scene including a foreground object by at least one rolling shutter sensor. The at least one image includes a pattern in an image region of the foreground object comprising a series of alternate dark and bright pixel regions. The at least one image is captured by setting exposure time of the sensor as equal or less than a read-out time of a set of pixel rows of a plurality of pixel rows, and by facilitating a repeating sequence of ON and OFF of flash such that flash is ON while capturing the set of pixel rows, and OFF while capturing subsequent set of pixel rows. The method includes determining a contour of the foreground object in the at least one image based on the pattern.

20 Claims, 6 Drawing Sheets

(51) Int. Cl.
*H04N 13/00* (2006.01)
*H04N 5/353* (2011.01)
*H04N 5/225* (2006.01)

(52) U.S. Cl.
CPC .... *G06T 2207/20144* (2013.01); *H04N 5/2256* (2013.01); *H04N 5/3532* (2013.01); *H04N 2013/0092* (2013.01)

(56) References Cited

U.S. PATENT DOCUMENTS

| | | | |
|---|---|---|---|
| 2010/0245609 A1* | 9/2010 | Estevez | G06T 7/0081 348/222.1 |
| 2011/0242334 A1* | 10/2011 | Wilburn | H04N 5/2354 348/207.1 |
| 2012/0242795 A1 | 9/2012 | Kane et al. | |
| 2012/0242806 A1 | 9/2012 | Ibrahim et al. | |
| 2012/0275667 A1 | 11/2012 | Lu | |
| 2013/0070121 A1 | 3/2013 | Gu et al. | |
| 2013/0127993 A1 | 5/2013 | Wang | |
| 2014/0198184 A1* | 7/2014 | Stein | G06K 9/00791 348/47 |
| 2014/0368661 A1* | 12/2014 | Angot | H04N 5/2256 348/164 |
| 2015/0138389 A1* | 5/2015 | Mishra | G06T 7/002 348/222.1 |

OTHER PUBLICATIONS

Green, "Multiplexed Photography: Single-Exposure Capture of Multiple Camera Settings", Thesis, Sep. 2009, pp. 1-124.

Oth et al., "Rolling Shutter Camera Calibration", IEEE Conference on Computer Vision and Pattern Recognition, Jun. 23-28, 2013, pp. 1360-1367.

Sun et al., "Flash Cut: Foreground Extraction With Flash and No-Flash Image Pairs", IEEE Conference on Computer Vision and Pattern Recognition, Jun. 17-22, 2007, 8 Pages.

"Image Rectification", Wikipedia, Retrieved on Feb. 6, 2015, Webpage available at : http://en.wikipedia.org/wiki/Image_rectification.

Papadimitriou et al., "Epipolar Line Estimation and Rectification for Stereo Image Pairs", IEEE Transactions on Image Processing, vol. 5, No. 4, Apr. 1996, pp. 672-676.

"Rolling Shutter", Wikipedia, Retrieved on Feb. 6, 2015, Webpage available at : http://en.wikipedia.org/wiki/Rolling_shutter.

Zhou et al., "Robust Stereo With Flash and No-Flash Image Pairs", IEEE Conference on Computer Vision and Pattern Recognition, Jun. 16-21, 2012, 8 pages.

Gu et al., "Coded Rolling Shutter Photography: Flexible Space-Time Sampling", IEEE International Conference on Computational Photography, Mar. 29-30, 2010, pp. 1-8.

* cited by examiner

METHOD AND APPARATUS FOR SEGMENTATION OF FOREGROUND OBJECTS IN IMAGES AND PROCESSING THEREOF

TECHNICAL FIELD

Various implementations relate generally to method, apparatus, and computer program product for segmentation of foreground objects in images and processing thereof.

BACKGROUND

Various electronic devices, for example, cameras, mobile phones, and other multimedia devices are widely used for capturing image of a scene. Such devices are also configured to perform post processing of the captured images. Some examples of the post processing include segmenting the foreground or background part of the captured images, and performing disparity or depth calculations upon the captured images. Some devices are also capable of capturing stereoscopic images, and performing image rectification of the stereoscopic images captured by two or more sensors present in the devices. Image rectification is a transformation process (specified by a rectification matrix) that corrects image distortion by transforming the image into a standard coordinate system. Normally, during manufacturing, as a factory setting, the rectification matrix is applied for a pre-determined camera position determined by camera calibration process. Such a pre-computed rectification matrix would be inappropriate, if the cameras were displaced, due to a fall, variation in temperature tolerances or wear and tear caused by time. Even small changes in the camera hardware would necessitate an estimation of calibration of rectification matrices, without which there would be significant errors in any applications (like disparity estimation, low light, fusion etc) that need point to point pixel correspondences between images captured by two sensors. Such errors in the rectification of the images are magnified for multiple sensors that are separated by small distance in smaller hand-held devices.

SUMMARY OF SOME EMBODIMENTS

Various aspects of examples embodiments are set out in the claims.

In a first aspect, there is provided a method comprising: facilitating capture of at least one image of a scene comprising a foreground object by at least one rolling shutter sensor of an apparatus for generating a pattern in an image region of the foreground object in the at least one image, the pattern comprising at least a series of alternate dark and bright pixel regions, wherein the at least one image is captured by: setting exposure time of the at least one rolling shutter sensor as substantially equal to or less than a read-out time of a set of pixel rows of a plurality of pixel rows of the at least one image; and facilitating a repeating sequence of an ON state and an OFF state of a flash of the apparatus such that the flash is in the ON state while capturing the set of pixel rows of the plurality of pixel rows, and the flash is in OFF state while capturing a subsequent set of pixel rows of the plurality of pixel rows; and determining a contour of the foreground object in the at least one image based on the pattern in the image region of the foreground object in the at least one image.

In a second aspect, there is provided a method comprising: facilitating capture of a first image of a scene comprising a foreground object by a first rolling shutter sensor of an apparatus for generating a first pattern in an image region of the foreground object in the first image; facilitating capture of a second image of the scene by a second rolling shutter sensor of the apparatus for generating a second pattern in an image region of the foreground object in the second image, each of the first pattern and the second pattern comprising at least a series of alternate dark and bright pixel regions, wherein the first image and the second image are captured by: setting an exposure time of the first rolling shutter sensor and an exposure time of the second rolling shutter sensor as substantially equal to or less than a read-out time of a set of pixel rows of a plurality of pixel rows captured by the first rolling shutter sensor and the second rolling shutter sensor, respectively, and facilitating a repeating sequence of an ON state and an OFF state of a flash of the apparatus such that the flash is in the ON state while capturing the set of pixel rows of the plurality of pixel rows, and the flash is in the OFF state while capturing a subsequent set of pixel rows of the plurality of pixel rows; determining a first contour of the foreground object in the first image based on the first pattern; and determining a second contour of the foreground object in the second image based on the second pattern.

In a third aspect, there is provided an apparatus comprising at least one processor; and at least one memory comprising computer program code, the at least one memory and the computer program code configured to, with the at least one processor, cause the apparatus to perform at least: facilitate capture of a first image of a scene comprising a foreground object by a first rolling shutter sensor of an apparatus for generating a first pattern in an image region of the foreground object in the first image; facilitate capture of a second image of the scene by a second rolling shutter sensor of the apparatus for generating a second pattern in an image region of the foreground object in the second image, each of the first pattern and the second pattern comprising at least a series of alternate dark and bright pixel regions, wherein the first image and the second image are captured by: setting an exposure time of the first rolling shutter sensor and an exposure time of the second rolling shutter sensor as substantially equal to or less than a read-out time of a set of pixel rows of a plurality of pixel rows captured by the first rolling shutter sensor and the second rolling shutter sensor, respectively, and facilitating a repeating sequence of an ON state and an OFF state of a flash of the apparatus such that the flash is in the ON state while capturing the set of pixel rows of the plurality of pixel rows, and the flash is in the OFF state while capturing a subsequent set of pixel rows of the plurality of pixel rows; determine a first contour of the foreground object in the first image based on the first pattern; and determine a second contour of the foreground object in the second image based on the second pattern.

In a fourth aspect, there is provided a computer program product comprising at least one computer-readable storage medium, the computer-readable storage medium comprising a set of instructions, which, when executed by one or more processors, cause an apparatus to perform at least: facilitate capture of a first image of a scene comprising a foreground object by a first rolling shutter sensor of an apparatus for generating a first pattern in an image region of the foreground object in the first image; facilitate capture of a second image of the scene by a second rolling shutter sensor of the apparatus for generating a second pattern in an image region of the foreground object in the second image, each of the first pattern and the second pattern comprising at least a series of alternate dark and bright pixel regions, wherein the first image and the second image are captured by: setting an exposure time of the first rolling shutter sensor and an exposure time of the second rolling shutter sensor as substantially equal to or less than a read-out time of a set of pixel rows of a plurality of pixel rows captured by the first rolling shutter sensor and the second rolling shutter sensor, respectively, and facilitating a repeating sequence of an ON state and an OFF state of a flash of the apparatus such that the flash is in the ON state while capturing the set of pixel rows of the plurality of pixel rows, and the flash is in the OFF state while capturing a subsequent set of pixel rows of the plurality of pixel rows; determine a first contour of the foreground object in the first image based on the first pattern; and determine a second contour of the foreground object in the second image based on the second pattern.

In a fifth aspect, there is provided an apparatus comprising: means for facilitating capture of a first image of a scene comprising a foreground object by a first rolling shutter sensor of an apparatus for generating a first pattern in an image region of the foreground object in the first image; means for facilitating capture of a second image of the scene by a second rolling shutter sensor of the apparatus for generating a second pattern in an image region of the foreground object in the second image, each of the first pattern and the second pattern comprising at least a series of alternate dark and bright pixel regions, wherein the first image and the second image are captured by: setting an exposure time of the first rolling shutter sensor and an exposure time of the second rolling shutter sensor as substantially equal to or less than a read-out time of a set of pixel rows of a plurality of pixel rows captured by the first rolling shutter sensor and the second rolling shutter sensor, respectively, and facilitating a repeating sequence of an ON state and an OFF state of a flash of the apparatus such that the flash is in the ON state while capturing the set of pixel rows of the plurality of pixel rows, and the flash is in the OFF state while capturing a subsequent set of pixel rows of the plurality of pixel rows; means for determining a first contour of the foreground object in the first image based on the first pattern; and means for determining a second contour of the foreground object in the second image based on the second pattern.

In a sixth aspect, there is provided a computer program comprising program instructions which when executed by an apparatus, cause the apparatus to: facilitate capture of a first image of a scene comprising a foreground object by a first rolling shutter sensor of an apparatus for generating a first pattern in an image region of the foreground object in the first image; facilitate capture of a second image of the scene by a second rolling shutter sensor of the apparatus for generating a second pattern in an image region of the foreground object in the second image, each of the first pattern and the second pattern comprising at least a series of alternate dark and bright pixel regions, wherein the first image and the second image are captured by: setting an exposure time of the first rolling shutter sensor and an exposure time of the second rolling shutter sensor as substantially equal to or less than a read-out time of a set of pixel rows of a plurality of pixel rows captured by the first rolling shutter sensor and the second rolling shutter sensor, respectively, and facilitating a repeating sequence of an ON state and an OFF state of a flash of the apparatus such that the flash is in the ON state while capturing the set of pixel rows of the plurality of pixel rows, and the flash is in the OFF state while capturing a subsequent set of pixel rows of the plurality of pixel rows; determine a first contour of the foreground object in the first image based on the first pattern; and determine a second contour of the foreground object in the second image based on the second pattern.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7 of the drawings.

Figure 1:
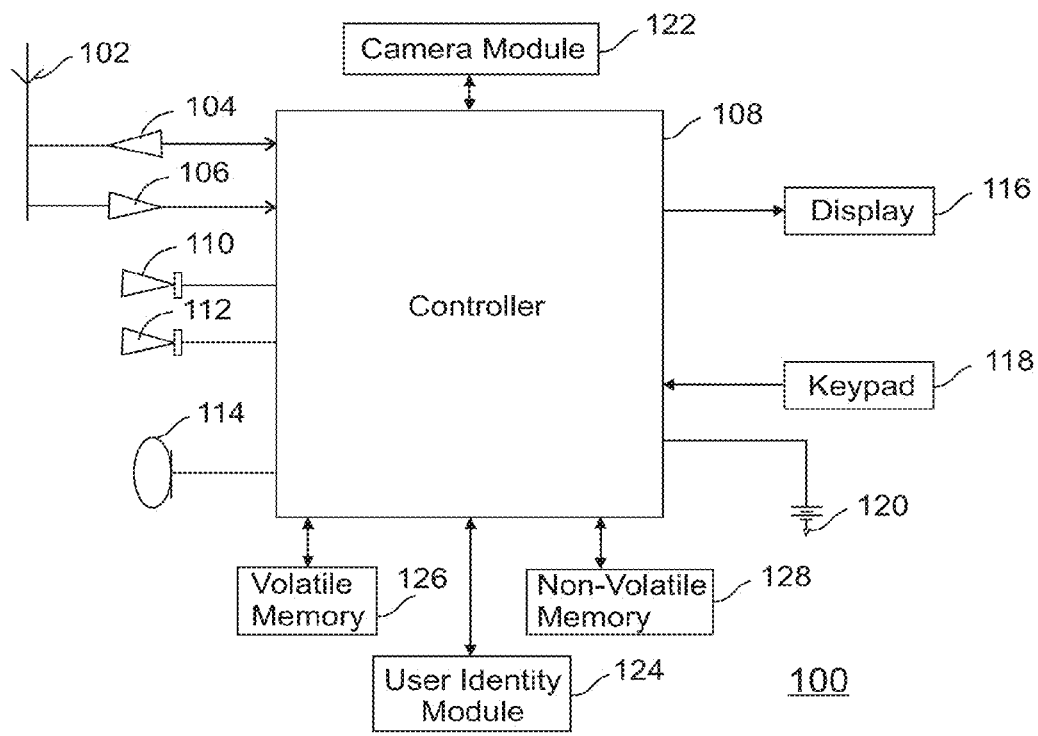
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
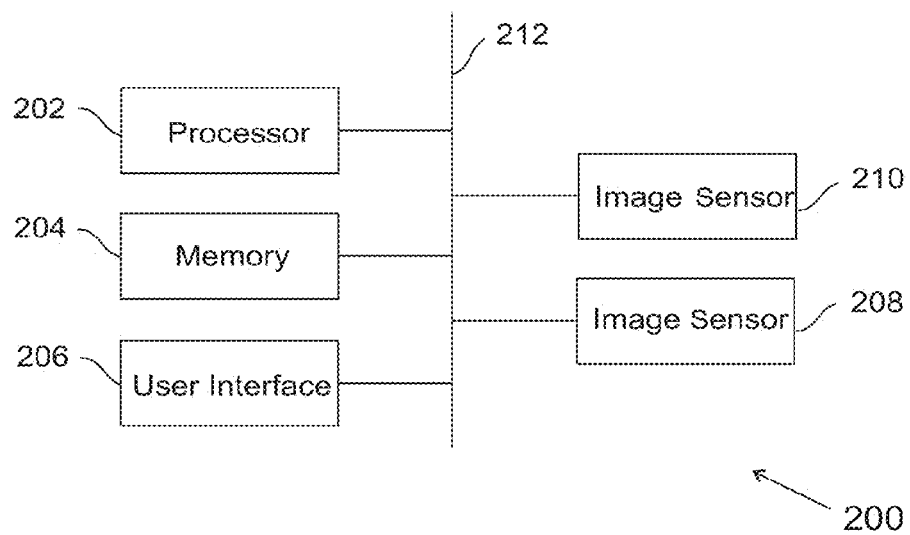
FIG. 2 illustrates an apparatus for segmentation of foreground objects and processing thereof, in accordance with an example embodiment.

FIG. 2 illustrates an apparatus 200 for segmentation of foreground objects in images and processing thereof, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of the media content may include audio content, video content, data, and a combination thereof.

In an example embodiment, the electronic device may be embodied as to include at least one image sensor, such as an image sensor 208 and image sensor 210. In various example embodiment, the image sensor 208 and 210 are example of rolling shutter sensors. The image sensors 208 and 210 are capable of capturing the light coming from the scene, and each line (or a set of lines at a time) on the sensors 208 and 210 is read-out in a sequential manner, for example, one (or a smaller number of pixel rows) pixel row at a time is read-out at one time instant. Though only two image sensors 208 and 210 are shown in the example representation of FIG. 2, but the electronic device may include more than two image sensors or only one image sensor. The image sensors 208 and 210 may be in communication with the processor 202 and/or other components of the apparatus 200. The image sensors 208 and 210 may be in communication with other imaging circuitries and/or software, and is configured to capture digital images or to make a video or other graphic media files. The image sensors 208 and 210 and other circuitries, in combination, may be an example of at least one camera module such as the camera module 122 of the device 100. The image sensors 208 and 210, along with other components may also be configured to capture a plurality of images depicting the scene from a same position or from different positions (with same or different angles). In an example embodiment, the image sensors 208 and 210 may be accompanied with corresponding lenses pointing towards same direction of the scene so that field of view of both the image sensors 208 and 210 are aligned together.

These components (202-210) may communicate to each other via a centralized circuit system 212 to facilitate segmentation of foreground object in one or more images of the scene and processing thereof. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, the apparatus 200 is caused to segment foreground object from at least one image. In this example embodiment, the processor 202 is configured to, with the content of the memory 204, and optionally with other components described herein, to cause the apparatus 200 to facilitate capture of the at least one image of the scene comprising a foreground object. Herein, the 'scene' refers to arrangement (natural, manmade, sorted or assorted) of one or more objects of which the images or videos can be captured, or of which the preview can be generated, and herein the 'foreground object' refer to an object, for example, a man, a car, or any other object that is closer to a device (for example, a camera module including image sensor 208 and/or 210) capturing the images of the scene as compared to distance of the background of the scene from the device. In this example embodiment, the at least one image is captured by at least one rolling shutter sensor present or otherwise accessible to the apparatus 200. Examples of the at least one rolling shutter sensor are the image sensors 208 and 210. In some example embodiments, the at least one image may be prerecorded or stored in an apparatus 200, or may be received from sources external to the apparatus 200. In such example embodiments, the apparatus 200 is caused to receive the at least one image from external storage medium such as DVD, Compact Disk (CD), flash drive, memory card, or from external storage locations through Internet, Bluetooth®, and the like. In an example embodiment, a processing means may be configured to facilitate capture of the at least one image of the scene including the foreground object. An example of the processing means may include the processor 202, which may be an example of the controller 108, and/or the image sensors 208 and 210.

In this example embodiment, the apparatus 200 is caused to facilitate capture of the at least one image by setting a low exposure time of the at least one rolling shutter sensor and by facilitating a repeating sequence of the ON state and an OFF state of a flash of the apparatus 200. In this example embodiment, the apparatus 200 is caused to set an exposure time of the at least one rolling shutter sensor equal to or less than a read-out time of a set of pixel rows of a plurality of pixel rows associated with a frame of the scene. In this example embodiment, the exposure time of the at least one rolling shutter sensor is set to the order of a single row exposure (or exposure of a very less number of rows), and it should be noted that each row is read at the different time instances because of the sensors 208 and/or 210 that are rolling shutter sensors. For instance, if there are the plurality of pixel rows (for example, 1024 pixel rows) in a frame (or image) of the scene and a total read-out time of the 1024 pixel rows is 30 milliseconds (ms), the exposure time of the sensor 208 and/or 210 may be set as substantially equal to read-out time of a single pixel row, for example, 30/1024~30 microseconds.

Further, in this example embodiment, the apparatus 200 is caused to set the repeating sequence of the ON state and the OFF state of the flash of the apparatus 200. Herein, the 'flash' represents any artificial light generated while capturing images to help illuminate the scene. For instance, the sequence of ON state and OFF state of the flash may be repeated such that while capturing a pixel row (or a set of pixel rows) of the plurality of pixel rows, the flash is in the ON state and while capturing subsequent pixel row (or subsequent set of pixel rows) of the plurality of pixel rows the flash is in the OFF state. In an example, an ON/OFF frequency of the flash may be set high such that the flash is switched ON during the exposure of pixel row 1, is switched ON during the exposure of row 2, switched ON again for the exposure of pixel row 3, and this sequence is repeated while capturing all of the pixel rows (for example, 1024 pixel rows) by the sensors 208 and/or 210.

It should be noted that as the exposure time of the sensors 208 and/or 210 is very less (of the order of the read-out time of a single pixel row), only the light reflected from the foreground object is collected by the sensors 208 and/210 and the light reflected from background objects (or the objects lying at significant distances from the apparatus 200 capturing the images) are not collected in a significant manner so as to form the images of the background objects. It should further be noted that, due to periodic ON/OFF of the flash, the pixel rows during the exposure of which the flash is in the ON state are detected as brighter as compared to those pixel rows during the exposure of which the flash is in the OFF state. In an example, if the exposure time is set as substantially equal to or less than a read-out time of a single pixel row and if the flash is ON during the exposure of a first pixel row (within an image region associated with the foreground object), the first pixel row is detected as a bright pixel row within the image region associated with the foreground object. In this example, if during the exposure of a second pixel row (within the image region associated with the foreground object) the flash is OFF, the second pixel row is detected as a dark pixel row within the image region associated with the foreground object. Further, during the exposure of a third pixel row (within the image region), the flash is turned ON causing the third pixel row to be detected as the bright pixel row within the image region associated with the foreground object, and this sequence is repeated. In an example embodiment, in this manner, a pattern is formed in the image region belonging to the foreground object that includes a series of alternate dark and bright pixel regions in the image region.

In an example embodiment, the apparatus 200 is caused to determine a contour of the foreground object in the at least one image based on the pattern in the image region of the foreground object within the image. Due to the low exposure time and the high frequency of ON/OFF of the flash, the pattern (a series of alternate bright and dark pixel rows) is present in the at least one image, and in an example embodiment, the contour of the foreground object may be marked out based on the pattern. Some example embodiments of determining the contour of the foreground object are further described with reference to FIGS. 3A-3B and FIGS. 4A-4B. In an example embodiment, the apparatus 200 is caused to segment the foreground object of the at least one image based on the contour of the foreground object. For instance, as the contour of the foreground object is marked out from the background of the image, the foreground object may be segmented from rest of the image using suitable techniques.

In various example embodiments, the apparatus 200 is caused to segment the foreground object in images captured from a stereoscopic (stereo) camera setup, and the apparatus 200 is caused to determine a rectification error in rectifying the images that are captured by the stereo camera setup. For instance, the rectification error may be caused due to an existing rectification matrix that is used by the apparatus 200 for rectification purposes of the images, and various example embodiments are capable of determining the presence of any such rectification error. Additionally or optionally, the apparatus 200 is also caused to determine the rectification matrix that may be used for rectifying the images captured by the stereo camera setup.

For example, in a stereo camera setup embodiment, the apparatus 200 is caused to facilitate capture of a first image by a first rolling shutter sensor (for example, the sensor 208) and facilitate capture of a second image by a second rolling shutter sensor (for example, the sensor 210). In an example, the apparatus 200 is caused to capture the first image (image I1) by the sensor 208 and caused to capture the second image (image I2) by the sensor 210. In this example, the apparatus 200 is caused to capture the image I1 and the image I2 by setting up the exposure time of the sensor 208 and sensor 210 substantially equal to or less than a read-out time of a set of pixel rows of the plurality of pixel rows, captured by the sensors 208 and 210, respectively. In an example embodiment, the set of pixel rows includes only one pixel row; and at one time instant, only one pixel row is read from the sensor 208 and 210. Further, in this example embodiment, the apparatus 200 is caused to set a repeating alternate sequence of ON state and OFF state of the flash such that while capturing the set of pixel rows (for example, a first pixel row in the image region associated with the foreground object) of the plurality of pixel rows, the flash is in the ON state; and while capturing subsequent set of pixel rows (for example, a second pixel row in the image region associated with the foreground object) of the plurality of pixel rows the flash is in the OFF state, and such sequence is repeated for all pixel rows in the images I1 and I2.

It should be noted that as the exposure time of the sensor 208 is very less (for example, of the order of the read-out time of a single pixel row), only the light that is reflected from the foreground object is collected by the sensor 208 and the light reflected from the background objects (or the objects lying at significant distances from the apparatus 200 capturing the image I1) are typically not collected sufficiently so as to form the images of the background objects. In this example, due to periodic ON/OFF of the flash, the pixel rows, during the exposure of which the flash is in the ON state, are detected as brighter as compared to those pixel rows during exposure of which the flash is in the OFF state. In this example, a first pattern (a series of alternate dark and bright pixel regions) is formed in the image region belonging to the foreground object in the image I1. In this example, a second pattern (a series of alternate dark and bright pixel regions) is formed in the image region belonging to the foreground object in the image I2.

In this example embodiment, the apparatus 200 is caused to determine a first contour of the foreground object in the first image (image I1) based on the first pattern. In this example embodiment, the apparatus 200 is caused to determine a second contour of the foreground object in the second image (image I2) based on the second pattern.

In an example embodiment, the apparatus 200 is caused to determine corner points at the first contour, and is caused to determine corner points at the second contour. Examples of the corner points may be pixels present at the intersection of two edges in a contour (the first contour or the second contour), an isolated pixel point, line ending or an optimal point on a curvature. The corner points on the contour may be detected by using suitable techniques, for example, the smallest univalue segment assimilating nucleus (SUSAN) corner detector, Moravec corner detection algorithm, the Harris and Stephens corner detection algorithm, the Forstner corner detection, the Trajkovic and Hedley corner detector, AST-based feature detectors, and the like. In an example, it may be assumed that the apparatus 200 is caused to determine corner points, for example, I1c1, I1c2, I1c3 and I1c4 in the image I1 and corresponding corner points I2c1, I2c2, I2c3 and I2c4 in the image I2, respectively.

In an example embodiment, the apparatus 200 is caused to determine correspondences between the corner points determined at the first contour and the corner points determined at the second contour. Since the corner points are already determined in the first contour (for example, I1c1, I1c2, I1c3 and I1c4) and the second contour (I2c1, I2c2, I2c3 and I2c4), correspondences are determined based on the locations of these corner points.

In an example embodiment, the apparatus 200 is caused to perform rectification of the first image I1 and the second image I2 based on a rectification matrix stored or otherwise accessible to the apparatus 200. In an example, rectification of the images I1 and I2 is a transformation process (specified by a rectification matrix) that corrects image distortion by transforming the image I1 and I2 into a standard coordinate system. In an embodiment, rectifying the images I1 and I2 comprises aligning the images I1 and I2, to generate the rectified images IR1 and IR2, respectively, such that horizontal lines (pixel rows) of the image IR1 correspond to horizontal lines (pixel rows) of the image IR2. It should be noted that the process of rectification for the pair of images I1 and I2 transforms planes of the original pair of images I1 and I2 to the standard coordinate system such that the resulting epipolar lines (in the images IR1 and IR2) are parallel and horizontal. It should be noted that during manufacturing, as a factory setting of the apparatus 200, the rectification matrix is applied for a pre-determined camera position determined by camera calibration process, and the apparatus 200 is caused to rectify the image I1 and I2 using an existing rectification matrix stored in the apparatus 200, or otherwise accessible to the apparatus 200 to obtain the rectified images IR1 and IR2.

In an example embodiment, the apparatus 200 is caused to determine error in the rectification matrix (that is used by the apparatus 200 for obtaining IR1 and IR2) of the apparatus 200 based on the rectified first image (IR1), the rectified second image (IR2) and the correspondences between the corner points at the first contour and the corner points at the second contour. For instance, in an example, it may be assumed that the two corresponding corner points of the foreground object lie on corresponding epipolar lines in the image I1 and I2, respectively. It should be noted that to have a proper rectification, conjugate corner points (in the images IR1 and IR2) should have the same vertical coordinates. For example, if the corner point I1c1 and I2c1 lie on the corresponding horizontal scan lines in the images IR1 and IR2 such that these points have same vertical coordinate, it may be considered that the images IR1 and IR2 are rectified correctly, and no error may be determined in the rectification matrix. Further, if the corner point I1c1 and I2c1 do not lie on the corresponding horizontal scan lines in the images IR1 and IR2 (these points have different vertical coordinates), it may be considered that the images IR1 and IR2 are not rectified correctly, and an error in the rectification matrix may be determined. It should be noted that as the correspondences between the corner points in the images I1 and I2 is already determined, the error in the rectification matrix may be determined using any suitable techniques, for example, using epipolar constraints, re-projection error computation, by computing geometric distances between corresponding projected points in the images I1 and I2 using Sampson error technique, and the like.

In various example embodiments, the apparatus 200 is caused to segment a foreground object in images captured from a stereo camera setup, and is caused to determine the rectification matrix that may be used for rectifying the images captured by the stereo camera setup. In such example embodiments, the apparatus 200 is caused to facilitate capture of the first image of the scene by positioning the foreground object at a first distance and a second distance from the apparatus 200, respectively, and facilitating capture of the second image of the scene by positioning the foreground object at the first distance and the second distance from the apparatus 200, respectively. In an example, an image I1 is captured by the sensor 208 and an image I2 is captured by the sensor 210 by positioning the foreground object at a distance L1 from a device (for example, the apparatus 200) capturing the images Ii1 and I2. For example, an image I1' is captured by the sensor 208 and the image i2' is captured by the sensor 210 by positioning the foreground object at a distance L2 from the device capturing the images I1' and I2'.

In this example embodiment, the apparatus 200 is caused to determine a first contour (C1) of the foreground object in the first image (image I1) based on the first pattern when the foreground object is positioned at the distance L1 from the device, and the apparatus 200 is caused to determine a first contour (C1') of the foreground object in the first image (I1') based on the first pattern when the foreground object is positioned at the distance L2 from the device. In this example embodiment, the apparatus 200 is caused to determine a second contour (C2) of the foreground object in the second image (image I2) based on the second pattern when the foreground object is positioned at the distance L1 from the device, and the apparatus 200 is caused to determine a second contour (C2') of the foreground object in the second image (I2') based on the second pattern when the foreground object is positioned at the distance L2 from the device.

In this example embodiment, the apparatus 200 is caused to determine corner points (for example I1c1, I1c2, I1c3 and I1c4) at the first contour (C1) of the foreground object and the corner points (for example I2c1, I2c2, I2c3 and I2c4) at the second contour (C2) of the foreground object, wherein the first image I1 and the second image I2 are captured by positioning the foreground object at the first distance (or the depth level, for example, at distance L1) from the apparatus 200. In this example embodiment, the apparatus 200 is caused to determine corner points (for example I1'c1, I1'c2, I1'c3 and I1'c4) at the first contour (C1') of the foreground object (in the image i1') and corner points (for example I2'c1, I2'c2, I2'c3 and I2'c4) at the second contour (C2') of the foreground object (in the image i2'), wherein the first image I1' and the second image I2' are captured by positioning the foreground object at the second distance (or the depth level, for example, at distance L2) from the apparatus 200.

In this example embodiment, the apparatus 200 is caused to determine a first set of correspondences between the corner points at the first contour and the corner points at the second contour, wherein the first image and the second image are captured by positioning the foreground object at the first distance/depth level (L1) from the apparatus 200. For instance, the apparatus 200 is caused to determine the first set of correspondences between the corner points I1c1, I1c2, I1c3 and I1c4 and the corner points I2c1, I2c2, I2c3 and I2c4. In this example embodiment, the apparatus 200 is caused to determine a second set of correspondences between the corner points at the first contour and the corner points at the second contour, wherein the first image and the second image are captured by positioning the foreground object at the second distance/depth level (L2) from the apparatus 200. For instance, the apparatus 200 is caused to determine the second set of correspondences between the corner points I1'c1, I1'c2, I1'c3 and I1'c4 and the corner points I2'c1, I2'c2, I2'c3 and I2'c4.

In this example embodiment, the apparatus 200 is caused to determine the rectification matrix for rectification of the first image and the second image based on the first set of correspondences and the second set of correspondences. As the correspondences between the corner points are already determined between the first image and the second image with different depth levels (for the example, the foreground object positioned at the distance L1 and the distance L2), the rectification matrix may be determined using suitable techniques such as correlation based methods and/or feature based methods.

It should be noted that the only examples of two depth levels (the distances L1 and L2) are described for the example purposes, and in fact, the apparatus 200 may be caused to determine the images captured by the first sensor and the second sensor by positioning the foreground objects at more than two depth levels and correspondences may be determined between the images captured by the first sensor and the second sensor, at each depth level, respectively. Further, based on the correspondences between the corner points in the images captured by the first sensor and the corresponding corner points in the images captured by the second sensor, the rectification matrix may be determined for the apparatus 200.

Figure 3A:
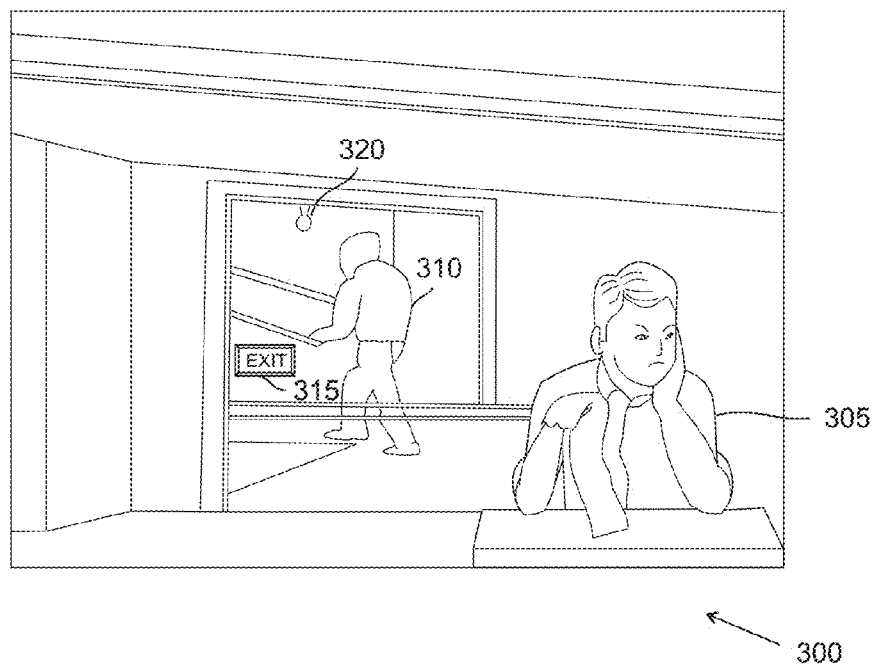
FIG. 3A illustrates an example representation of an image captured in an example scenario and FIG. 3B illustrates an example representation of an image captured in an accordance with an example embodiment.
Figure 3B:
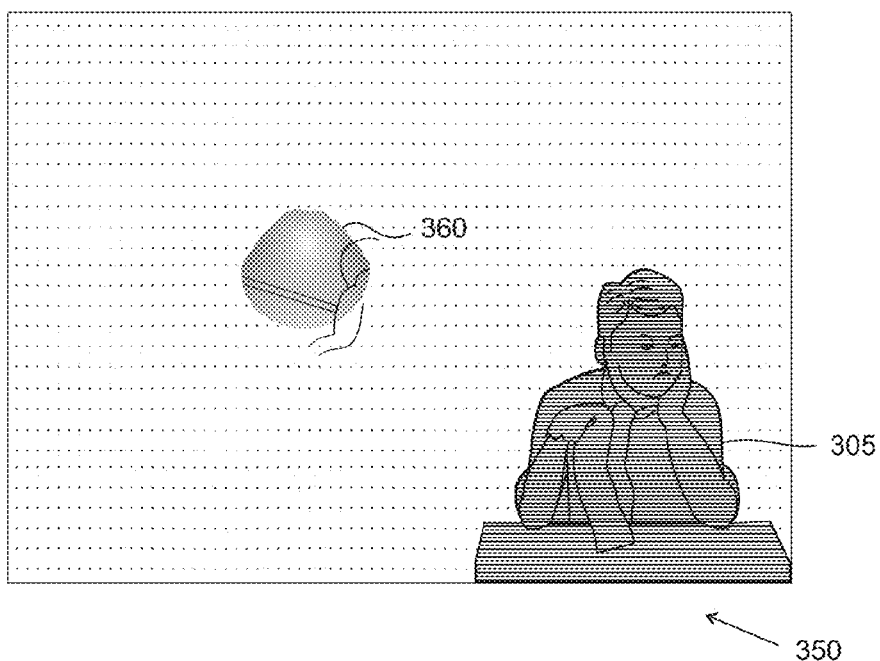

FIG. 3A represents an image 300 captured in an example scenario, and the FIG. 3B represents a representative image 350 of an image captured in accordance with an example embodiment. As shown in the image 300, a foreground object 305, among other foreground objects; and some background objects 310, 315 and 320 (a light source) among other background objects are shown. It should be noted that the image 300 is captured by a sensor with a normal setup, for example, without setting the exposure time low and the utilizing a coded flash (for example, a repeating alternate sequence of ON/OFF states). The image 350 is captured by a rolling shutter sensor (for example, the sensor 208 or 210) by setting the exposure time of the order of a read-out time of a single pixel row and by facilitating a repeating pattern of the ON state and OFF state of the flash of the apparatus 200, as described in accordance with various example embodiments with reference to FIG. 2.

As shown in the image 350, an image region associated with the foreground object 305 has a pattern including a series of alternate dark and bright pixel rows, whereas some of the background objects such as 310 and 315 (that are visible in the image 300) are not shown in the image 350. For the purposes of the representation in FIG. 3B, the background image regions (including image areas of the background objects) that may actually be imaged as dark, are shown with dotted pattern. As the exposure time is very small and the flash is turned ON and OFF for alternate pixel rows, the alternate bright and dark pixel rows are visible in the foreground object 305. Further, due the low exposure time, the light reflected from the background objects 310 and 315 is not collected by the sensor, and these background objects, among other background objects, are not visible in the image 350. As shown in the image 350, a pattern 360 is generated due to the background object 320 is visible due to its inherent illumination of the background object 320, however the pattern 360 does not have any pattern such as a series of alternate dark and bright pixel rows, as the coded (or pre-determined) pattern of the flash (for example, alternate ON and OFF for successive pixel rows) does not affect the imaging of the background objects.

Figure 4A:
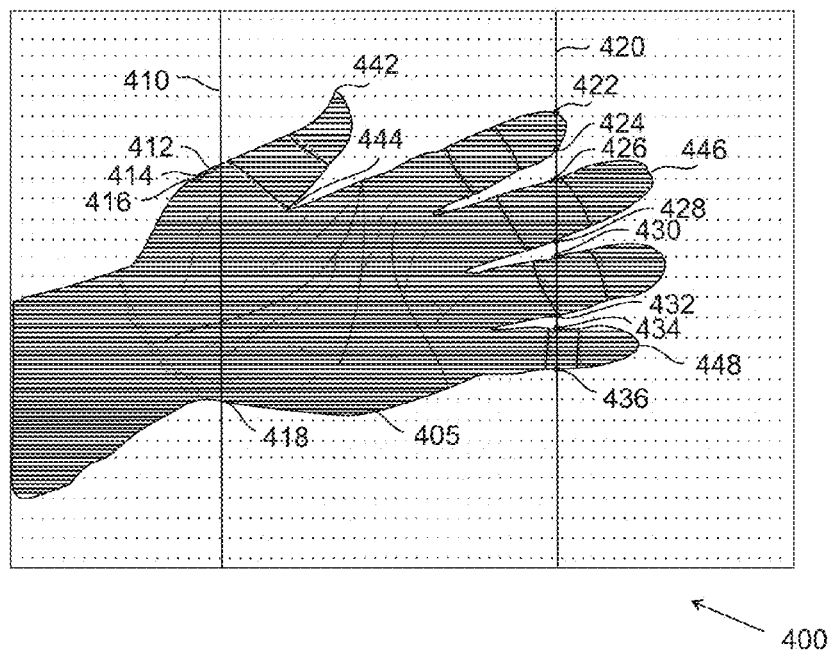
FIG. 4A illustrates a first image captured by a first rolling shutter sensor and FIG. 4B illustrates a second image captured by a second rolling shutter camera, in accordance with another example embodiment.
Figure 4B:
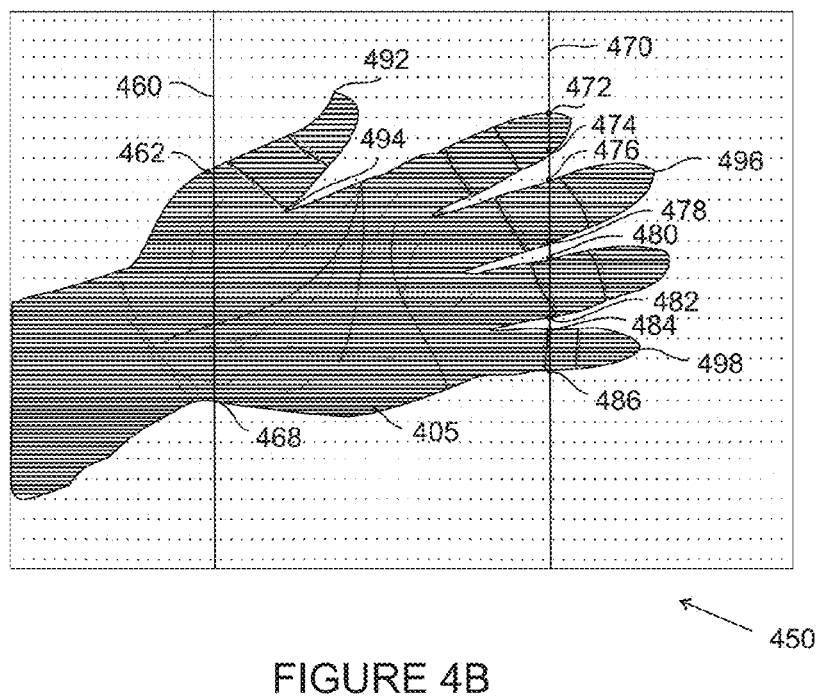

An example embodiment of determining contour in a stereo camera setup is further described in reference to FIGS. 4A and 4B, and the FIGS. 4A and 4B represent an example only, and should not be considered limiting to the scope of the various example embodiments.

FIG. 4A illustrates a first image 400 captured by a first rolling shutter sensor and FIG. 4B illustrates a second image 450 captured by a second rolling shutter camera, in accordance with another example embodiment. The image 400 may be captured by the first sensor (for example, the sensor 208) of an apparatus such as the apparatus 200 using the low exposure time and the pre-determined pattern (repeated ON/OFF) of the flash of the apparatus 200, and the image 450 may be captured by the apparatus 200 using the same exposure time (as in case of capture of the image 400) and the pre-determined pattern of the flash of the apparatus 200. In an example embodiment, the sensors 208 and 210 form a stereoscopic pair of sensors in the apparatus 200. For the purposes of the representation in FIGS. 4A and 4B, background image regions (including image areas of the background objects) that may actually be imaged as dark, are shown with dotted pattern, and a hand shown in the images 400 and 450 is a foreground object.

In an example embodiment, contours of the foreground object (for example, a foreground object 405 (a hand)) are detected in the images 400 and 450. In an example embodiment, pixel points lying on the contours (also termed as "contour pixels") of the foreground object 405 are determined by processing pixel columns (searching for the pixel points present on the pixel columns) in the images 400 and 450. In an example embodiment, for determining a contour of the foreground object in an image, the processor 200 is caused to determine contour pixels of the foreground object at a plurality of pixel columns in the image (for example, the image 400 or 450) based on the determined pattern in an image region of the foreground object in the image. In an example embodiment, the pixel columns intersecting with the image region of the foreground object are processed to determine presence (or locations) of the contour pixels on the pixel columns. In an example embodiment, the contour associated with the foreground object is formed based on the contour pixels of the foreground object determined at the plurality of pixel columns.

In an example embodiment, at a pixel column, the apparatus 200 is caused to determine one or more start pixels on the pixel column and corresponding one or more end pixels on the pixel column. In an example embodiment, the apparatus 200 is caused to assign the one or more start pixels and the one or more end pixels as the contour pixels at the pixel column. In an example embodiment, a start pixel of the one or more start pixels is a pixel that has a brightness level more than a first threshold and an end pixel of the one or more end pixels is a pixel that has a brightness level less than a second threshold, and wherein the pattern (for example, a continuous pattern) lies at the pixel column starting from the start pixel to the end pixel.

For instance, in a pixel column (for example, shown as 410), if it is determined that a pixel (see, 412) is a bright pixel (for example, having brightness more than the first threshold), a next pixel 414 (for example, the pixel immediately below the pixel 412 in the pixel column 410) is a dark pixel (for example, having brightness less than the second threshold), and a next pixel 416 (for example, the pixel immediately below the pixel 414 in the pixel column 410) is a bright pixel and the sequence of alternate dark and bright pixels are repeated for a threshold number of times, the pixel 412 may be determined as a first start pixel in the pixel column 410. Further, if the alternate sequence of the dark and bright pixels is broken, the pixel at which the sequence is broken may be considered as a first end pixel in the pixel column 410. For instance, if the alternate sequence of the dark and bright pixels is continued till a pixel 418, and hence the pixel 418 is determined as the first end pixel in the pixel column 410. In this example representation, two pixels, the first start pixel 412 and the first end pixel 418 form the contour pixel of the foreground object 405 at the pixel column 410.

It should be noted that on some pixel columns, there may be more than two pixel points forming the contour of the foreground object. For example, for pixel column 420, the pixel 422 is the first start pixel and the pixel 424 is the first end pixel, and the pixel 426 is the second start pixel and the pixel 428 is the second end pixel, the pixel 430 is the third start pixel and the pixel 432 is the third end pixel, and the pixel 434 is the fourth start pixel and the pixel 436 is the fourth end pixel. In an example embodiment, the pixels 422-436 form the pixel points belonging to the contour of the foreground object 405 on the pixel column 420 of the image 400.

It should be noted that only two pixel columns 410 and 420 are shown for the example purposes for determining the contour of the foreground object 405 in the image 400, and presence of the pixel points may be detected on the pixel columns that intersect with the image region associated with the foreground object 405 present in the image 400. As described for the image 400, the pixel points forming the contour of the foreground object 405 are also determined in the image 450. For example, as shown in the image 450, the pixels 462 and 468 are determined as the pixels belonging the contour of the foreground object 405 on the pixel column 460. In this example, for the pixel column 470, the pixel 472 is the first start pixel and the pixel 474 is the first end pixel, the pixel 476 is the second start pixel and the pixel 478 is the second end pixel, the pixel 480 is the third start pixel and the pixel 482 is the third end pixel and the pixel 484 is the fourth start pixel and the pixel 486 is the fourth end pixel. In an example embodiment, the pixels 472-486 form the pixels belonging to the contour of the foreground object 405 on the pixel column 470 of the image 450.

In some example embodiments, the exposure time may be set such that it is equal to or less than a read-out time of more than one pixel row at a time, and flash ON/OFF may be synchronized with the exposure time. For instance, the exposure time of the first and second sensors may be set such that these sensors can read n (for example, n being 1, 2, 3 etc.) number of pixel rows at a time, and the flash is set such that while the first N pixel rows are being read the flash in ON (or OFF), and while reading the next N pixel rows the flash is OFF (or ON), and the alternate ON/OFF sequence of the flash is maintained. In such example embodiments, following steps may be performed for each pixel column for determining the pixels (on each respective pixel column) that belong to the contour of the foreground object.

---

1. Find first pixel in a pixel column that is a bright pixel (having brightness more than a first threshold)
2. Count the consecutive pixels starting from the bright pixel (for example, n1) which are bright pixels
3. Find the next pixel in the pixel column that is a dark pixel (having brightness less than a second threshold)
4. Count the consecutive pixels starting from the dark pixel (for example, n2) which are dark pixels
5. Repeat the alternate sequence of finding the bright pixels and the dark pixels as long as a condition of "abs(n1-n2) < threshold" is satisfied
6. Mark the start pixel (s) and the end point(s) in the pixel column where the condition "abs(n1-n2) < threshold" is satisfied in a continuous manner
7. Determine the start pixels and the end pixels as pixels associated with the contour of the foreground object

---

In an example embodiment, corner points are detected on the first contour and the second contour determined in the images 400 and 450, respectively. Some example of the corner points are shown in FIGS. 4A and 4B. For instance, the apparatus 200 is caused to determine corner points, for example, 442, 444, 446 and 448 in the image I1 and corresponding corner points 492, 494, 496 and 498 in the image I2. The apparatus 200 is caused to determine correspondences between the corner points 442, 444, 446 and 448 in the image I1 and the corner points 492, 494, 496 and 498 in the image I2. In various example embodiments, such correspondences are used to determine whether there is any error in the rectification matrix. Further, correspondences, if calculated on various depth levels, may also be used by the apparatus 200 to determine the rectification matrix.

In some scenarios, there may be a rectification error introduced due to a movement of the foreground object during the capture of the images I1 and I2 that is irrespective of any possible rectification error introduced by misalignments of the sensors or caused by other variations. Some example embodiments are capable of determining whether there is any movement in the foreground object in the scene while capturing the images I1 and I2. In such example embodiments, the flash may include more than one color of light during a single exposure time of the at least one pixel row to detect the motion of the foreground object in the scene.

In an example embodiment, the flash may have three different color patterns, for example, Red, Green or Blue in any order, or even in any particular order. In the exposure time T for each pixel row, the Red flash may be turned ON for the first T/3 time duration, the Green flash may be turned ON for the next T/3 time duration and the Blue flash may be for the last T/3 time duration. It should be noted that if the foreground object is not in motion, the three lights will add up to white color. Accordingly, the bright patterns in the foreground object appear as white in color. However, if the foreground object is in motion, the three lights will not add up in the blurred edges of the object, and the bright patterns in the foreground object appear in rainbow color trail (R, G, B or a combination of them). In an example embodiment, the color trails at the edges of the foreground object may be analyzed to determine whether the foreground object is in motion or not, and whether the object motion is a contributing factor in the error detected in the rectification matrix.

Figure 5:
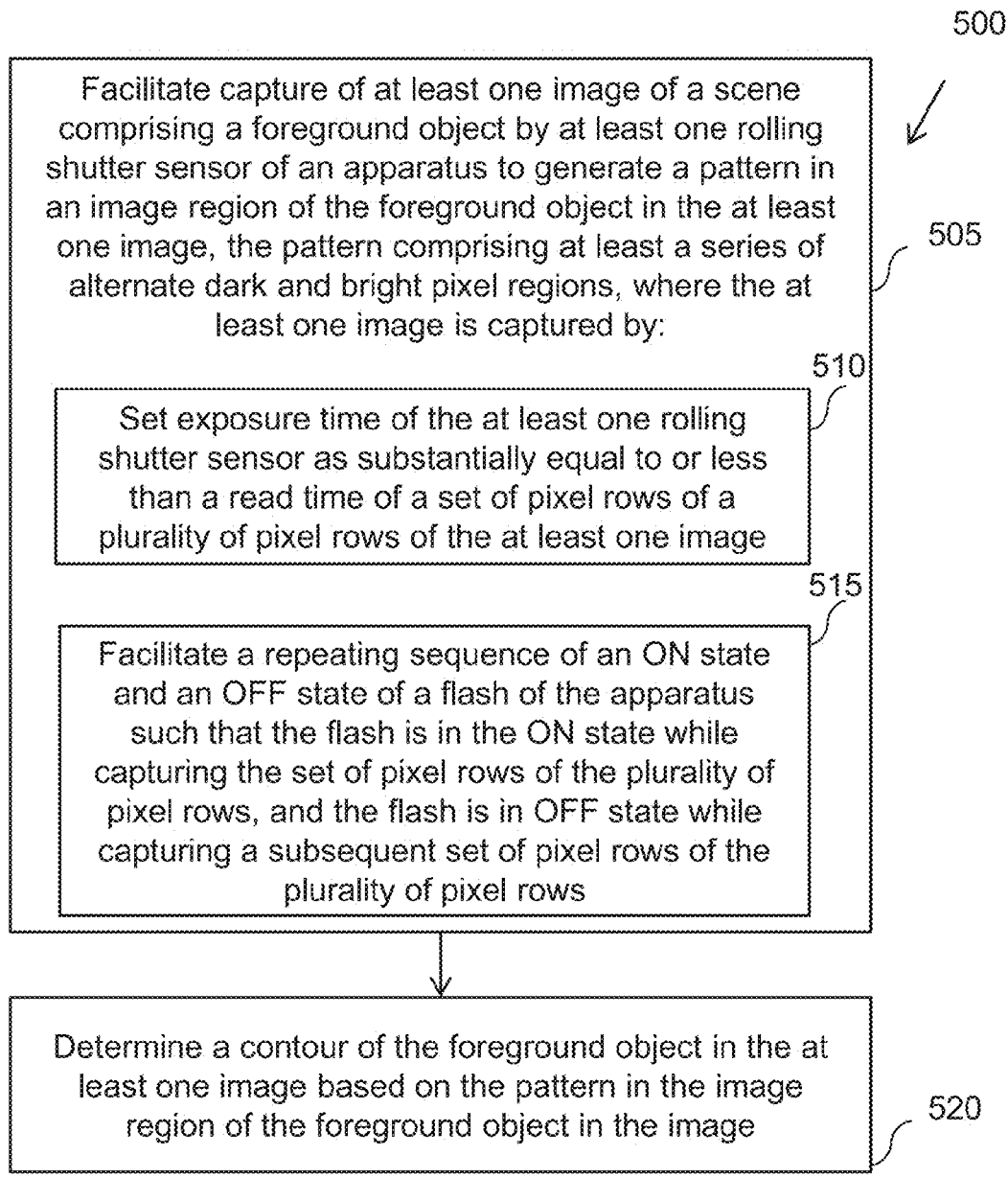
FIG. 5 is a flowchart depicting an example method for determining foreground objects, in accordance with an example embodiment.

FIG. 5 is a flowchart depicting an example method 500 for determining foreground objects, in accordance with an example embodiment. In an example embodiment, the method 500 comprises determining contours of the foreground object in the images for segmentation of the foreground objects. The method 500 is shown and explained with reference to FIGS. 2 to 4B. The method 500 depicted in the flow chart may be executed by, for example, the apparatus 200 of FIG. 2.

At 505, the method 500 includes facilitating capture of at least one image of a scene comprising a foreground object by at least one rolling shutter sensor of an apparatus to generate a pattern in an image region of the foreground object in the at least one image. In an example embodiment, the pattern comprises at least a series of alternate dark and bright pixel regions. An example of the apparatus is the apparatus 202, and examples of the at least one rolling shutter sensor are the sensors 208 and 210. In an example embodiment, operation of the block 505 is performed by at least performing the operations of blocks 510 and 515.

In an example embodiment, for capturing the at least one image, at block 510, the exposure time of the at least one rolling shutter sensor is set as substantially equal to or less than a read-out time of a set of pixel rows of a plurality of pixel rows. The set of pixel rows may include only one pixel row, however, the number of pixel rows in the set of pixel rows may be more than one, but the number is significantly smaller as compared to total number of pixel rows in the at least one image. In this example embodiment, the exposure time of the at least one rolling shutter sensor is set as substantially equal to the order of a single row exposure (or a very less number of row exposure), and it should be noted that each row is read at the different time instances because of the rolling shutter sensors (for example, 208 and/or 210).

In an example embodiment, for capturing the at least one image, at block 515, the method 500 includes facilitating a repeating sequence of the ON state and the OFF state of the flash of the apparatus 200. For instance, the sequence of ON state and OFF state of the flash may be repeated such that while capturing a pixel row (considering the set of pixel rows includes only one pixel row) of the plurality of pixel rows, the flash is in the ON state and while capturing subsequent pixel row in the plurality of pixel rows the flash is in the OFF state. It should be noted that due to the low exposure of the at least one sensor and repeated ON/OFF sequence of the flash, a pattern (for example, a series of alternate dark and bright pixel regions) is formed in the image region belonging to the foreground object in the at least one image.

At 520, the method 500 includes determining a contour of the foreground object in the at least one image based on the pattern in the image region of the foreground object in the image. Due to the low exposure time, and the high ON/OFF frequency of the flash, the pattern (a series of alternate bright and dark pixel rows) is present in the at least one image, and in an example embodiment, the contour of the foreground object is determined based on the pattern. In an example embodiment, the method 500 may further comprise segmenting the foreground objects in the at least one image based on the determined contour of the foreground object.

Figure 6:
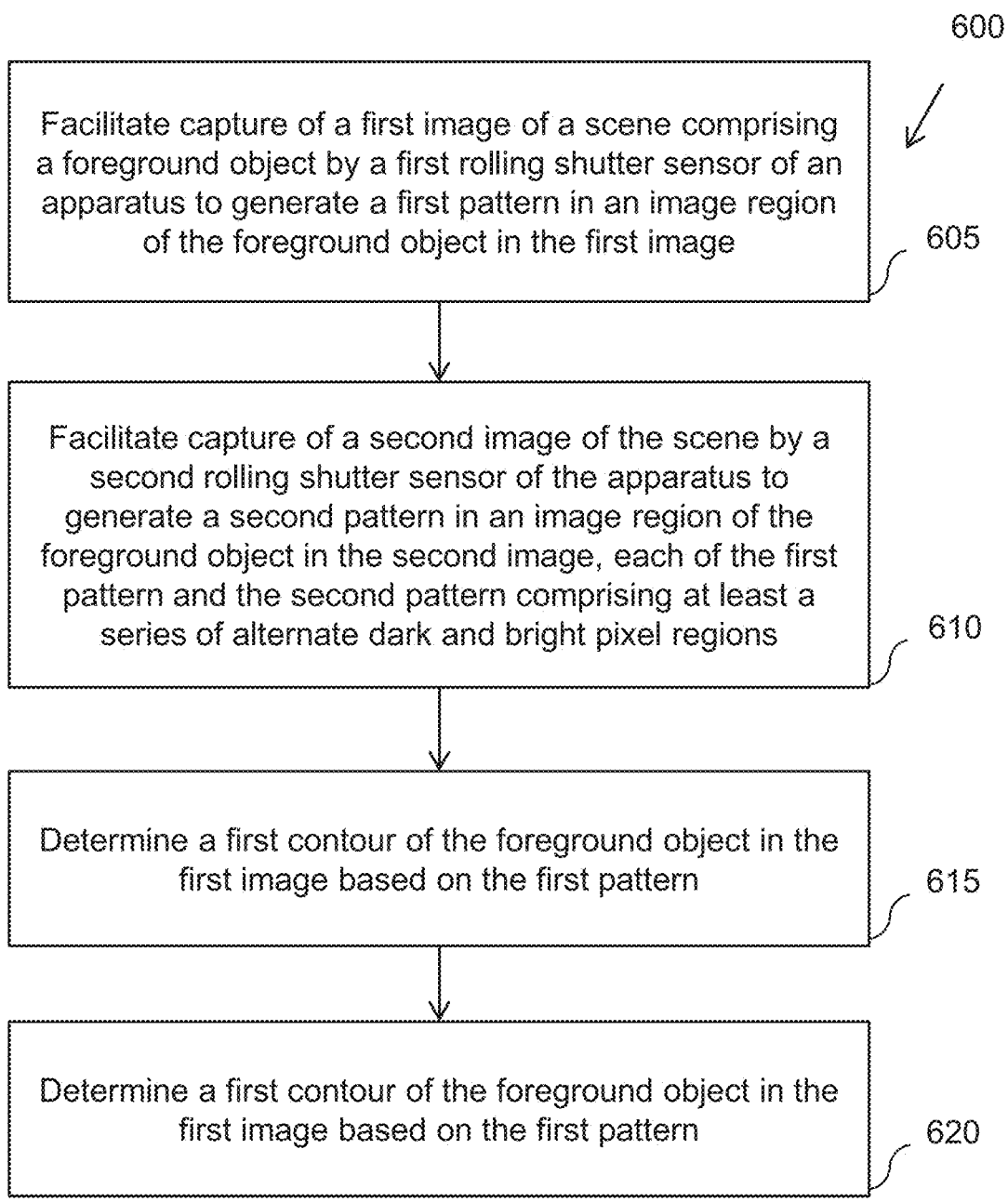
FIG. 6 is a flowchart depicting an example method for determining foreground objects in a stereo camera setup, in accordance with another example embodiment.

FIG. 6 is a flowchart depicting an example method 600 for determining foreground objects, in accordance with an example embodiment. Example references are made to FIGS.

2 to 4B for the description of the method 600. The method 600 depicted in the flow chart may be executed by, for example, the apparatus 200 of FIG. 2.

At 605, the method 600 includes facilitating capture of a first image (I1) by a first rolling shutter sensor (for example, the sensor 208). In an example embodiment, the first image is captured to generate a first pattern in an image region of the foreground object in the first image, where the first pattern comprises at least a series of alternate dark and bright pixel regions. At 610, the method 600 includes facilitating capture of a second image (I1) by a second rolling shutter sensor (for example, the sensor 210). In an example embodiment, the second image is captured to generate a second pattern in an image region of the foreground object in the second image, where the second pattern comprises at least a series of alternate dark and bright pixel regions. In this example, the image I1 and the image I2 are captured by setting up the exposure time of the sensor 208 and sensor 210 substantially equal to or less than a read-out time of a set of pixel rows of the plurality of pixel rows, captured by the sensors 208 and 210, respectively. In an example embodiment, the set of pixel rows includes only one pixel row, and at one time instant, only one pixel row is read from the sensor 208 and 210. Further, in this example embodiment for capturing the images I1 and I2, a repeating alternate sequence of ON state and OFF state of the flash is set such that while capturing the set of pixel rows (for example, a first pixel row in the image region associated with the foreground object) of the plurality of pixel rows, the flash is in the ON state; and while capturing subsequent set of pixel rows (for example, a second pixel row in the image region associated with the foreground object) of the plurality of pixel rows the flash is in OFF state, and such sequence is repeated for all pixel rows in the images I1 and I2.

It should be noted that as the exposure time of the sensors 208 and 210 is very less (for example, of the order of the read-out time of a single pixel row), only the light that is reflected from the foreground object is collected by the sensors 208 and 210 and the light reflected from background objects (or the objects lying at significant distances from the device capturing the images I1 and I2) are typically not collected. In an example embodiment, due to periodic ON/OFF of the flash, the pixel rows, during the exposure of which the flash is in the ON state, are detected as brighter as compared to those pixel rows during which exposure of which the flash is in the OFF state. In this example, a first pattern (a series of alternate dark and bright pixel regions) is formed in the image region belonging to the foreground object in the image I1. In this example, a second pattern (a series of alternate dark and bright pixel regions) is formed in the image region belonging to the foreground object in the image I2.

At 615, the method 600 includes determining a first contour of the foreground object in the first image based on the first pattern. At 620, the method 600 includes determining a second contour of the foreground object in the second image based on the second pattern. Since, the first pattern and the second pattern of the foreground object are present in the images I1 and I2, respectively, the first contour and the second contour are determined (for example, marked out) based on the first pattern and the second pattern, respectively.

Figure 7:
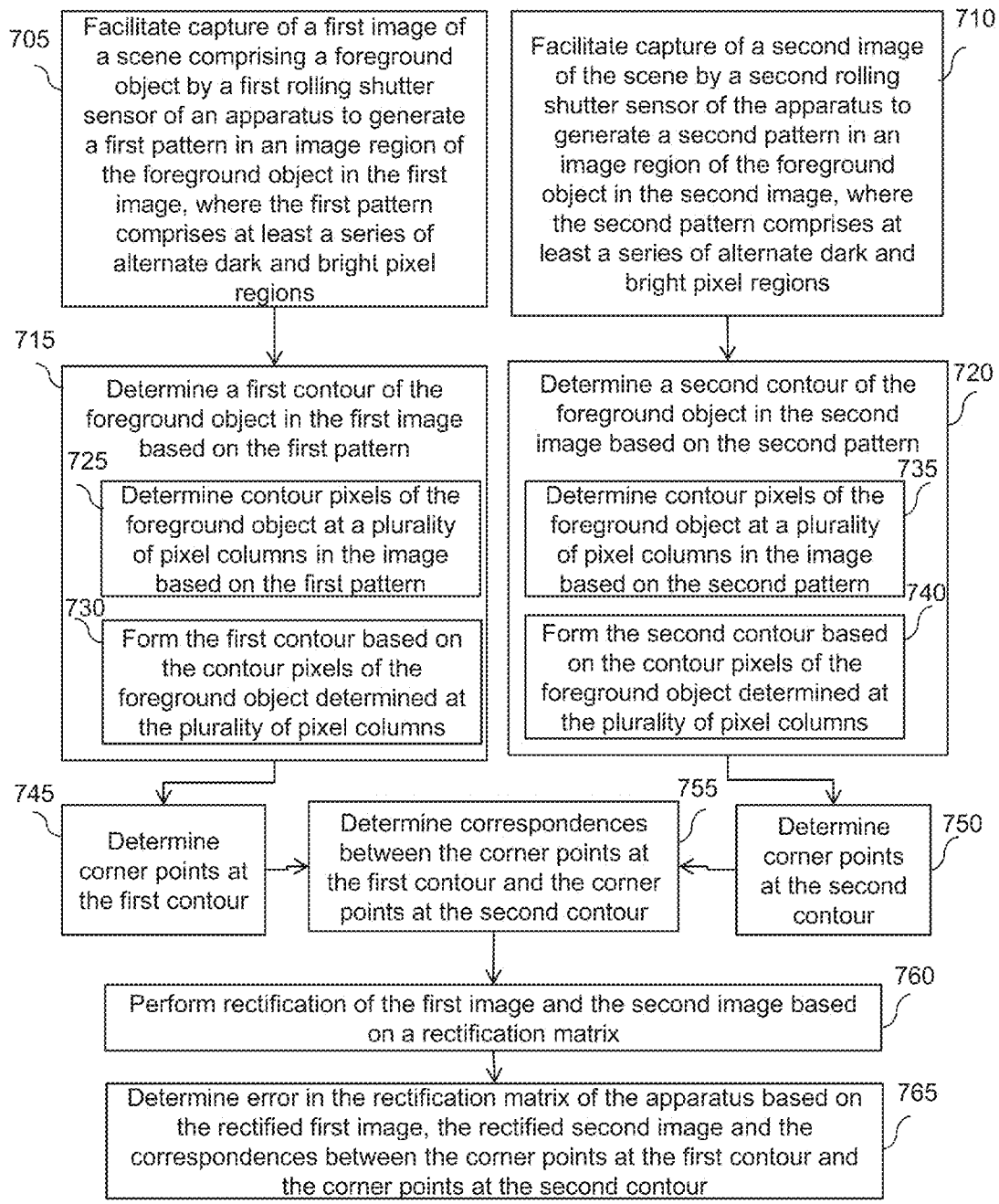
FIG. 7 is a flowchart depicting an example method for determining rectification error, in accordance with an example embodiment.

FIG. 7 is a flowchart depicting an example method 700 for determining rectification errors in an apparatus, in accordance with an example embodiment. Example references are made to FIGS. 2 to 6 for the description of the method 700. The method 700 depicted in the flow chart may be executed by, for example, the apparatus 200 of FIG. 2.

At 705, the method 700 includes facilitating capture of a first image (I1) by a first rolling shutter sensor (for example, the sensor 208). At 710, the method 700 includes facilitating capture of a second image (I2) by a second rolling shutter sensor (for example, the sensor 210). In an example embodiment, the images I1 and I2 are captured simultaneously. It should be noted that though the operations of the blocks 705 and 710 are shown as separately, but the images I1 and I2 may be captured by a same capture instruction and at a same time. An example of the operation of the block 705 is the operation performed at the block 605, and an example of the operation of the block 710 is the operation performed at the block 610.

At 715, the method 700 includes determining a first contour of the foreground object in the image I1 based on the first pattern. At 720, the method 700 includes determining a second contour of the foreground object in the image I2 based on the second pattern. Examples of the operations of the blocks 715 and 720 are operations of the blocks 615 and 620, respectively. In an example embodiment, operations of the blocks 715 and 720 may be performed at a same time.

In an example embodiment, the operation of the block 715 may be performed by blocks 725 and 730. For instance, at block 725, the method 700 includes determining contour pixels of the foreground object at a plurality of pixel columns in the image I1 based on the first pattern. Some examples of determination of the contour pixels are described with reference to FIGS. 4A and 4B. At block 730, the method 700 includes forming the first contour based on the contour pixels of the foreground object determined at the plurality of pixel columns in the image I1.

In an example embodiment, the operation of the block 720 may be performed by blocks 735 and 740. For instance, at block 735, the method 700 includes determining contour pixels of the foreground object at a plurality of pixel columns in the image I2 based on the second pattern. Some examples of determination of the contour pixels are described with reference to FIGS. 4A and 4B. At block 740, the method 700 includes forming the second contour based on the contour pixels of the foreground object determined at the plurality of pixel columns in the image I2.

In an example embodiment, at block 745, the method 700 includes determining corner points at the first contour of the foreground object in the first image I1 based on the first pattern. At block 750, the method 700 includes determining corner points at the second contour of the foreground object in the second image I2 based on the second pattern.

At block 755, the method 700 includes determining correspondences between the corner points at the first contour and the corner points at the second contour. Since the corner points are already determined in both the first contour (for example, I1c1, I1c2, I1c3 and I1c4) and the second contour (I2c1, I2c2, I2c3 and I2c4), correspondences are determined by matching the corner points at the first contour and the corner point at the second contour.

At block 760, the method 700 includes performing rectification of the first image I1 and the second image I2 based on a rectification matrix stored or otherwise accessible to the apparatus 200. For instance, the apparatus 200 is caused to rectify the image I1 and I2 using an existing rectification matrix in the apparatus 200, or otherwise accessible to the apparatus 200 to obtain rectified images IR1 and IR2.

At block 765, the method 700 includes determining error in the rectification matrix of the apparatus based on the rectified first image (IR1), the rectified second image (IR1) and the correspondences between the corner points at the first contour and the corner points at the second contour. For instance, in an example, it may be assumed that the two corresponding corner points of the foreground object lie on corresponding epipolar lines in the image I1 and I2, respectively. It should be noted that to have a proper rectification, conjugate corner points (in the images IR1 and IR2) should have the same vertical coordinate. For example, if the corner point I1c1 and I2c1 lie on the corresponding horizontal scan lines in the images IR1 and IR2, it may be considered that the IR1 and IR2 are rectified correctly, and no error may be determined in the rectification matrix. Further, if the corner point I1c1 and I2c1 do not lie on the corresponding horizontal scan lines in the images IR1 and IR2, it may be considered that the IR1 and IR2 are not rectified correctly, and an error in the rectification matrix may be determined. It should be noted that as the correspondences between the corner points in the images I1 and I2 is already determined, the error in the rectification matrix may be determined using any suitable techniques, for example, using epipolar constraints, reprojection error computation, and the like.

In various example embodiments, the present technology also provides methods for segment a foreground object in images captured from a stereo camera setup, and to determine the rectification matrix that may be used for rectifying the images captured by the stereo camera setup. In such example embodiments, an example method includes performing the operation of the blocks 705 and 710 by positioning the foreground object at the first distance and the second distance from a device (for example, the apparatus 200), respectively. For example, an image I1 is captured by the sensor 208 and an image I2 is captured by the sensor 210 by positioning the foreground object at a distance L1 from the apparatus 200. Further, the method includes capturing an image I1' by the sensor 208 and the image I2' by the sensor by positioning the foreground object at a distance L2 from the apparatus 200.

In this example embodiment, the method includes performing the operations of the blocks 715 and 720 for the images I1, I2, respectively that are captured at one depth level (or distance) L1. In this example embodiment, the method also includes performing operations of the blocks 715 and 720 for the images I1' and I2', respectively, that are captured at another depth level L2. For instance, the method includes determining the first contour (C1) of the foreground object in the first image (image I1) based on the first pattern when the foreground object is positioned at the distance L1 from the apparatus 200, and the method includes determining a first contour (C1') of the foreground object in the first image (image I1') based on the first pattern when the foreground object is positioned at the distance L2 from the apparatus 200. In this example embodiment, the method includes determining the second contour (C2) of the foreground object in the second image (I2) based on the second pattern when the foreground object is positioned at the distance L1 from the apparatus 200, and the apparatus 200 is caused to determine a second contour (C2') of the foreground object in the second image (image I2') based on the second pattern when the foreground object is positioned at the distance L2 from the apparatus 200.

In this example embodiment, the method 700 includes performing the operations of the blocks 745 and 750 for the images I1 and I2, and includes performing the operations of the blocks 745 and 750 for the images I1' and I2'. For example, the corner points (for example I1c1, I1c2, I1c3 and I1c4) may be determined at the first contour (C1) of the foreground object and the corner points (for example I2c1, I2c2, I2c3 and I2c4) may be determined at the second contour (C2) of the foreground object, for the depth level L1. Further, In this example embodiment, the method includes determining the corner points (for example I1'c1, I1'c2, I1'c3 and I1'c4) at the first contour (C1') of the foreground object (in the image I1') and the corner points (for example I2'c1, I2'c2, I2'c3 and I2'c4) at the second contour (C2') of the foreground object (in the image I2'), wherein the first image I1' and the second image I2' are captured by positioning the foreground object at the second distance (for example, distance L2) from the apparatus 200.

In this example embodiment, the method includes determining a first set of correspondences between the corner points at the first contour and the corner points at the second contour, wherein the first image and the second image are captured by positioning the foreground object at the first distance (L1) from the apparatus 200. For instance, the first set of correspondences between the corner points I1c1, I1c2, I1c3 and I1c4 and corner points I2c1, I2c2, I2c3 and I2c4 are determined. In this example embodiment, the apparatus 200 is caused to determine a second set of correspondences between the corner points at the first contour and the corner points at the second contour, wherein the first image and the second image are captured by positioning the foreground object at the second distance from the apparatus 200. For instance, the apparatus 200 is caused to determine the second set of correspondences between the corner points I1'c1, I1'c2, I1'c3 and I1'c4 and corner points I2'c1, I2'c2, I2'c3 and I2'c4.

In this example embodiment, the method includes determining a rectification matrix for rectification of the first image and the second image based on the first set of correspondences and the second set of correspondences. As the correspondences between the corner points are already determined between the first image and the second image with different depth levels (for the example, the foreground object positioned at the distance L1 and the distance L2), the rectification matrix may be determined using suitable techniques.

It should be noted that to facilitate discussions of the flowcharts of FIGS. 5 to 7, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 500, 600 and 700 are performed in an automated fashion. These operations involve substantially no interaction with the user. Other operations of the methods 500, 600 and 700 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to easily segment the foreground objects from the images based on the unique pattern formed in the image region associated with the foreground objects. Various example embodiments are capable of determining any error in rectification matrix in a stereo camera setup using simple techniques. Further, various example embodiments are capable of determining the rectification matrix that may be used by the apparatus for the rectification of the images captured by the stereo camera setup. It should be noted that various example embodiments are implemented without any need of additional hardware components, except a rolling shutter sensor and a flash.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising:
   causing capture of at least one image of a scene comprising a foreground object by at least one rolling shutter sensor of an apparatus to generate a pattern in an image region of the foreground object in the at least one image, the pattern comprising at least a series of alternate dark and bright pixel regions, wherein the at least one image is captured by:
      setting exposure time of the at least one rolling shutter sensor as substantially equal to or less than a read-out time of a set of pixel rows of a plurality of pixel rows of the at least one image; and
      causing performance of a repeating sequence of an ON state and an OFF state of a flash of the apparatus such that the flash is in the ON state while capturing the set of pixel rows of the plurality of pixel rows, and the flash is in OFF state while capturing a subsequent set of pixel rows of the plurality of pixel rows; and
   determining a contour of the foreground object in the at least one image based on the pattern in the image region of the foreground object in the at least one image.

2. The method as claimed in claim 1, wherein determining the contour comprises:
   determining contour pixels of the foreground object at a plurality of pixel columns in the at least one image based on the pattern; and
   forming the contour based on the contour pixels of the foreground object determined at the plurality of pixel columns.

3. The method as claimed in claim 2, wherein determining the contour pixels at a pixel column of the plurality of pixel columns comprises:
   determining one or more start pixels on the pixel column and corresponding one or more end pixels at the pixel column, wherein a start pixel of the one or more start pixels is a pixel that has a brightness level more than a first threshold and wherein an end pixel of the one or more end pixels is a pixel that has a brightness level less than a second threshold, and wherein the pattern lies at the pixel column starting from the start pixel to the end pixel;
   assigning the one or more start pixels and the one or more end pixels as the contour pixels at the pixel column.

4. The method as claimed in claim 1, further comprising segmenting the foreground object of the at least one image based on the contour of the foreground object.

5. The method as claimed in claim 1, further comprising detecting the foreground object in the at least one image.

6. The method as claimed in claim 1, wherein the set of pixel rows comprises one pixel row.

7. The method as claimed in claim 1, wherein causing capture of at least one image of a scene comprises:
   causing capture of a first image of the scene comprising the foreground object by a first rolling shutter sensor of an apparatus to generate a first pattern in an image region of the foreground object in the first image; and
   causing capture of a second image of the scene by the second rolling shutter sensor of the apparatus to generate a second pattern in an image region of the foreground object in the second image, each of the first pattern and the second pattern comprising at least a series of alternate dark and bright pixel regions.

8. The method as claimed in claim 7, wherein determining contour comprises:
   determining a first contour of the foreground object in the first image based on the first pattern; and determining a second contour of the foreground object in the second image based on the second pattern.

9. The method as claimed in claim 8, further comprising:
determining corner points at the first contour;
determining corner points at the second contour;
determining correspondences between the corner points at the first contour and the corner points at the second contour;
performing rectification of the first image and the second image based on a rectification matrix of the apparatus to generate a rectified first image and a rectified second image; and
determining an error in the rectification matrix of the apparatus based on the rectified first image, the rectified second image and the correspondences between the corner points at the first contour and the corner points at the second contour.

10. The method as claimed in claim 9, further comprising facilitating capture of the first image of the scene by positioning the foreground object at a first distance and a second distance from the apparatus, respectively, and facilitating capture of the second image of the scene by positioning the foreground object at the first distance and the second distance from the apparatus, respectively.

11. The method as claimed in claim 10, further comprising:
determining corner points at the first contour of the foreground object and corner points at the second contour of the foreground object, wherein the first image and the second image are captured by positioning the foreground object at the first distance from the apparatus;
determining corner points at the first contour of the foreground object and the corner points at the second contour of the foreground object, wherein the first image and the second image are captured by positioning the foreground object at the second distance from the apparatus;
determining a first set of correspondences between the corner points at the first contour and the corner points at the second contour, wherein the first image and the second image are captured by positioning the foreground object at the first distance from the apparatus;
determining a second set of correspondences between the corner points at the first contour and the corner points at the second contour, wherein the first image and the second image are captured by positioning the foreground object at the second distance from the apparatus; and
determining a rectification matrix based on the first set of correspondences and the second set of correspondences.

12. An apparatus comprising:
at least one processor; and
at least one memory comprising computer program code, the at least one memory and the computer program code configured to, with the at least one processor, cause the apparatus to at least perform:
cause capture of a first image of a scene comprising a foreground object by a first rolling shutter sensor of the apparatus to generate a first pattern in an image region of the foreground object in the first image;
cause capture of a second image of the scene by a second rolling shutter sensor of the apparatus to generate a second pattern in an image region of the foreground object in the second image, each of the first pattern and the second pattern comprising at least a series of alternate dark and bright pixel regions, wherein, to capture the first image and the second image, the apparatus is further caused to:
set an exposure time of the first rolling shutter sensor and an exposure time of the second rolling shutter sensor as substantially equal to or less than a readout time of a set of pixel rows of a plurality of pixel rows captured by the first rolling shutter sensor and the second rolling shutter sensor, respectively, and
cause performance of a repeating sequence of an ON state and an OFF state of a flash of the apparatus such that the flash is in the ON state while capturing the set of pixel rows of the plurality of pixel rows, and the flash is in the OFF state while capturing a subsequent set of pixel rows of the plurality of pixel rows;
determine a first contour of the foreground object in the first image based on the first pattern; and
determine a second contour of the foreground object in the second image based on the second pattern.

13. The apparatus as claimed in claim 12, wherein the apparatus is further caused, at least in part to:
determine corner points at the first contour;
determine corner points at the second contour;
determine correspondences between the corner points at the first contour and the corner points at the second contour;
perform rectification of the first image and the second image based on a rectification matrix of the apparatus to generate a rectified first image and a rectified second image; and
determine an error in the rectification matrix of the apparatus based on the rectified first image, the rectified second image and the correspondences between the corner points at the first contour and the corner points at the second contour.

14. The apparatus as claimed in claim 12, wherein the apparatus is further caused, at least in part to facilitate capture of the first image of the scene by positioning the foreground object at a first distance and a second distance from the apparatus, respectively, and facilitating capture of the second image of the scene by positioning the foreground object at the first distance and the second distance from the apparatus, respectively.

15. The apparatus as claimed in claim 14, wherein the apparatus is further caused, at least in part to:
determine corner points at the first contour of the foreground object and corner points at the second contour of the foreground object, wherein the first image and the second image are captured by positioning the foreground object at the first distance from the apparatus;
determine corner points at the first contour of the foreground object and the corner points at the second contour of the foreground object, wherein the first image and the second image are captured by positioning the foreground object at the second distance from the apparatus;
determine a first set of correspondences between the corner points at the first contour and the corner points at the second contour, wherein the first image and the second image are captured by positioning the foreground object at the first distance from the apparatus;
determine a second set of correspondences between the corner points at the first contour and the corner points at the second contour, wherein the first image and the second image are captured by positioning the foreground object at the second distance from the apparatus; and
determine a rectification matrix based on the first set of correspondences and the second set of correspondences.

16. The apparatus as claimed in claim 12, wherein for determining the first contour, the apparatus is further caused, at least in part to:
- determine contour pixels of the foreground object at a plurality of pixel columns in the first image based on the first pattern; and
- form the first contour based on the contour pixels of the foreground object determined at the plurality of pixel columns.

17. The apparatus as claimed in claim 16, wherein for determining the contour pixels, the apparatus is further caused, at least in part to:
- determine one or more start pixels at the pixel column and corresponding one or more end pixels at the pixel column, wherein a start pixel of the one or more start pixels is a pixel that has a brightness level more than a first threshold and wherein an end pixel of the one or more end pixels is a pixel that has a brightness level less than a second threshold, and wherein the first pattern lies at the pixel column starting from the start pixel to the end pixel; and
- assign the one or more start pixels and the one or more end pixels as the contour pixels at the pixel column.

18. The apparatus as claimed in claim 12, wherein for determining the second contour, the apparatus is further caused, at least in part to:
- determine contour pixels of the foreground object at a plurality of pixel columns in the second image based on the second pattern; and
- form the second contour based on the contour pixels of the foreground object determined at the plurality of pixel columns.

19. The apparatus as claimed in claim 18, wherein for determining the contour pixels, the apparatus is further caused, at least in part to:
- determine one or more start pixels at the pixel column and corresponding one or more end pixels at the pixel column, wherein a start pixel of the one or more start pixels is a pixel that has a brightness level more than a first threshold and wherein an end pixel of the one or more end pixels is a pixel that has a brightness level less than a second threshold, and wherein the second pattern lies at the pixel column starting from the start pixel to the end pixel; and
- assign the one or more start pixels and the one or more end pixels as the contour pixels at the pixel column.

20. A computer program product comprising at least one non-transitory programmable memory, the programmable memory comprising a set of instructions, which, when executed by one or more processors, cause an apparatus to at least perform:
- cause capture of a first image of a scene comprising a foreground object by a first rolling shutter sensor of the apparatus to generate a first pattern in an image region of the foreground object in the first image;
- cause capture of a second image of the scene by a second rolling shutter sensor of the apparatus to generate a second pattern in an image region of the foreground object in the second image, each of the first pattern and the second pattern comprising at least a series of alternate dark and bright pixel regions,
- wherein the first image and the second image are captured by:
  - setting an exposure time of the first rolling shutter sensor and an exposure time of the second rolling shutter sensor as substantially equal to or less than a read-out time of a set of pixel rows of a plurality of pixel rows captured by the first rolling shutter sensor and the second rolling shutter sensor, respectively, and
  - causing performance of a repeating sequence of an ON state and an OFF state of a flash of the apparatus such that the flash is in the ON state while capturing the set of pixel rows of the plurality of pixel rows, and the flash is in the OFF state while capturing a subsequent set of pixel rows of the plurality of pixel rows;
- determine a first contour of the foreground object in the first image based on the first pattern; and
- determine a second contour of the foreground object in the second image based on the second pattern.

* * * * *